United States Patent
Itadani et al.

(10) Patent No.: US 10,443,737 B2
(45) Date of Patent: Oct. 15, 2019

(54) SLIDE COMPONENT

(71) Applicant: EAGLE INDUSTRY CO., LTD., Minato-ku, Tokyo (JP)

(72) Inventors: Masatoshi Itadani, Tokyo (JP); Kazumasa Sunagawa, Tokyo (JP); Yuichiro Tokunaga, Tokyo (JP); Hideyuki Inoue, Tokyo (JP); Takeshi Hosoe, Tokyo (JP); Ryoma Yamakawa, Tokyo (JP); Yuta Negishi, Tokyo (JP); Kenji Kiryu, Tokyo (JP); Keiichi Chiba, Tokyo (JP); Akira Yoshino, Tokyo (JP); Hiroshi Kubota, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 10 days.

(21) Appl. No.: 15/521,608

(22) PCT Filed: Oct. 28, 2015

(86) PCT No.: PCT/JP2015/080332
§ 371 (c)(1),
(2) Date: Apr. 24, 2017

(87) PCT Pub. No.: WO2016/072325
PCT Pub. Date: May 12, 2016

(65) Prior Publication Data
US 2017/0241549 A1    Aug. 24, 2017

(30) Foreign Application Priority Data
Nov. 8, 2014  (JP) .................. 2014-227597

(51) Int. Cl.
*F16J 15/34*    (2006.01)
*F16J 15/40*    (2006.01)

(52) U.S. Cl.
CPC ............... *F16J 15/40* (2013.01); *F16J 15/34* (2013.01); *F16J 15/342* (2013.01); *F16J 15/3412* (2013.01)

(58) Field of Classification Search
CPC .... F16J 15/342; F16J 15/3448; F16J 15/3412; F16J 15/162; F16J 15/3432; F04D 29/128
See application file for complete search history.

(56) References Cited

U.S. PATENT DOCUMENTS

| 3,804,424 A | * | 4/1974 | Gardner | ............... F16J 15/3412 277/360 |
| 5,090,712 A | * | 2/1992 | Pecht | ................... F16J 15/3412 277/400 |

(Continued)

FOREIGN PATENT DOCUMENTS

| JP | 59110959 A | * | 6/1984 | ........... F16J 15/3412 |
| JP | 60-167861 | | * | 11/1985 |

(Continued)

OTHER PUBLICATIONS

International Search Report (ISR) dated Dec. 8, 2015, issued for International application No. PCT/JP2015/080332.

*Primary Examiner* — Eugene G Byrd
(74) *Attorney, Agent, or Firm* — Law Office of Katsuhiro Arai

(57) ABSTRACT

In an embodiment, a slide component includes one slide part 5 provided, on a low-pressure side of a sealing face thereof, with a negative pressure generation mechanism 10 including a negative pressure generation groove 10. The negative pressure generation groove 10a communicates with a high-pressure fluid side and is separated from a low-pressure fluid side by a land portion R. Another slide part 1 is provided, in a sealing face thereof, with at least one interference groove 15 communicating with the high-pressure fluid side for producing pressure variations in a fluid in the negative (Continued)

pressure generation groove 10*a*. The at least one interference groove 15 has an end 15*a* on an inside-diameter side extending to a position to radially overlap the negative pressure generation groove 10*a*.

20 Claims, 5 Drawing Sheets

(56) References Cited

U.S. PATENT DOCUMENTS

| | | | |
|---|---|---|---|
| 5,498,007 | A | 3/1996 | Kulkarni et al. |
| 9,863,473 | B2 * | 1/2018 | Hosoe ............... F16C 33/14 |
| 9,951,873 | B2 * | 4/2018 | Inoue ............... F16J 15/3412 |
| 9,964,215 | B2 * | 5/2018 | Itadani ............. F16J 15/3412 |
| 2004/0232622 | A1 * | 11/2004 | Gozdawa ............ F16J 15/342 |
| | | | 277/401 |
| 2005/0212217 | A1 * | 9/2005 | Tejima ............. F16J 15/3412 |
| | | | 277/399 |
| 2012/0217705 | A1 * | 8/2012 | Hosoe ............. F16J 15/3412 |
| | | | 277/400 |
| 2013/0209011 | A1 * | 8/2013 | Tokunaga ............ F16C 17/045 |
| | | | 384/123 |
| 2014/0197600 | A1 * | 7/2014 | Hosoe ............. F16J 15/3412 |
| | | | 277/409 |
| 2015/0226334 | A1 | 8/2015 | Itadani |
| 2016/0252182 | A1 * | 9/2016 | Itadani ............. F16J 15/3412 |
| | | | 277/401 |

FOREIGN PATENT DOCUMENTS

| | | |
|---|---|---|
| JP | H07180772 A | 7/1995 |
| JP | H07224948 A | 8/1995 |
| JP | H09133220 A | 5/1997 |
| JP | WO2014103630 A1 | 7/2014 |
| WO | WO-2014112455 A1 * 7/2014 ........... F16J 15/3412 |

* cited by examiner

SLIDE COMPONENT

This application is the U.S. National Phase under 35 U.S.C. § 371 of International Application PCT/JP2015/080332, filed Oct. 28, 2015, which claims priority to Japanese Patent Application No. 2014-227597, filed Nov. 8, 2014. The International Application was published under PCT Article 21(2) in a language other than English.

TECHNICAL FIELD

The present invention relates to slide components suitable for, for example, mechanical seals, bearings, and other slide units, and in particular, relates to slide components such as seal rings or bearings that require friction reduction by interposing a fluid between sealing faces as well as prevention of fluid leakage from the sealing faces.

BACKGROUND ART

A mechanical seal, an example of a slide component, is evaluated for its performance by a leakage rate, a wear rate, and a torque. In conventional arts, by optimizing the seal material and the sealing face roughness of mechanical seals, their performance is increased to achieve low leakage, long life, and low torque. However, due to growing awareness of environmental problems in recent years, a further improvement in the performance of mechanical seals has been demanded, for which technology development beyond the limits of the conventional arts has been required.

In that context, the present inventors have confirmed that in a mechanical seal of a water pump used for cooling a water-cooled engine, for example, an additive in LLC, a type of antifreeze, such as silicate or phosphate (hereinafter, referred to as a "deposit formation-causing substance") can be concentrated on a sealing face, forming deposits as time passes, and degrading the function of the mechanical seal. The deposit formation is considered as a phenomenon that occurs likewise in mechanical seals of apparatuses that handle chemicals or oils.

There is a known conventional mechanical seal in which a sealing face is formed with grooves to form a fluid layer in order to prevent occurrence of wear or burn damage of sealing faces due to frictional heat generation (see Patent Documents 1, 2, and 3, for example). However, these inventions only introduce a fluid into a sealing face, and do not take measures to prevent formation of deposits on a sealing face.

CITATION LIST

Patent Document

Patent Document 1: JP 07-180772 A
Patent Document 2: JP 07-224948 A
Patent Document 3: U.S. Pat. No. 5,498,007

SUMMARY OF THE INVENTION

Problem to be Solved by the Invention

The present invention has an object of providing a slide component that can prevent deposit formation on a sealing face as well as promoting circulation of a fluid on sealing faces while fulfilling both conflicting conditions of sealing and lubrication, to maintain the sealing function of the sealing faces for a long period of time.

Means for Solving Problem

To attain the above object, a slide component according to a first aspect of the present invention includes a pair of slide parts that relatively slide on each other, one of the slide parts being provided, on a low-pressure side of a sealing face thereof, with a negative pressure generation mechanism including a negative pressure generation groove, the negative pressure generation groove communicating with a high-pressure fluid side and being separated from a low-pressure fluid side by a land portion, the other of the slide parts being provided, in a sealing face thereof, with at least one interference groove communicating with the high-pressure fluid side for producing pressure variations in a fluid in the negative pressure generation groove, the at least one interference groove having an end on an inside-diameter side extending to a position to radially overlap the negative pressure generation groove.

According to this aspect, the pressure difference between an upstream end and a downstream end of the negative pressure generation groove is brought into a state of being constantly varying, and the flow of the fluid in the negative pressure generation groove also varies repeatedly. Thus, even when a sealed fluid contains a deposit formation-causing substance, formation of deposits in the negative pressure generation groove can be prevented, and the sealing function of the sealing faces can be maintained for a long period of time.

According to a second aspect of the present invention, in the slide component according to the first aspect, the at least one interference groove includes a plurality of interference grooves provided circumferentially, the plurality of interference grooves is arranged such that when one of the interference grooves is in a position facing the upstream end of the negative pressure generation groove, the other interference grooves are not in a position facing the downstream end of the negative pressure generation groove.

According to this aspect, the pressure variations between the upstream end and the downstream end of the negative pressure generation groove can be produced greatly and reliably, and formation of deposits in the negative pressure generation groove can be further prevented.

According to a third aspect of the present invention, in the slide component according to the first or second aspect, the negative pressure generation mechanism is formed from a reverse Rayleigh step mechanism.

According to this aspect, by providing a reverse Rayleigh step in the sealing face, the negative pressure generation mechanism can be easily formed.

According to a fourth aspect of the present invention, in the slide component according to any one of the first to third aspects, the one slide part is provided, in the sealing face thereof, with a fluid circulation groove that communicates with the high-pressure fluid side via an inlet portion and an outlet portion and is separated from the low-pressure fluid side by a land portion, and the negative pressure generation groove has a downstream end communicating with the inlet portion of the fluid circulation groove.

According to this aspect, there is a pressure difference between the inlet portion and the outlet portion of the fluid circulation groove, which is in a state of being constantly varying alternately, and the fluid in the fluid circulation groove repeats movements. Thus, in addition to the prevention of formation of deposits in the negative pressure generation groove, even when the sealed fluid contains a deposit formation-causing substance, formation of deposits in the fluid circulation groove can be prevented, and the sealing function of the sealing faces can be maintained for a long period of time.

According to a fifth aspect of the present invention, in the slide component according to any one of the first to fourth aspects, the one slide part is provided with a positive pressure generation mechanism including a positive pressure generation groove in a portion enclosed by the fluid circulation groove in the sealing face thereof and the high-pressure fluid side, and the positive pressure generation groove has an upstream side communicating with an inlet portion of the fluid circulation groove.

According to this aspect, in addition to the prevention of formation of deposits in the negative pressure generation groove and the fluid circulation groove, even when the sealed fluid contains a deposit formation-causing substance, formation of deposits in the positive pressure generation groove can be prevented, and the sealing function of the sealing faces can be maintained for a long period of time.

According to a sixth aspect of the present invention, in the slide component according to the fifth aspect, the positive pressure generation mechanism is formed from a Rayleigh step mechanism.

According to this aspect, by providing a Rayleigh step in the sealing face, the positive pressure generation mechanism can be easily formed.

According to a seventh aspect of the present invention, in the slide component according to any one of the first to sixth aspects, the one slide part is a stationary-side seal ring, the other slide part is a rotating-side seal ring, and the rotating-side seal ring is made larger in outside diameter and smaller in inside diameter than the stationary-side seal ring.

According to this aspect, the sealing face width depends on the stationary-side seal ring, which can reduce variation in the sealing face width.

Effect of the Invention

The present invention achieves outstanding effects as below.

(1) A pair of slide parts that relatively slide on each other is included, one of the slide parts is provided, on a low-pressure side of a sealing face thereof, with a negative pressure generation mechanism including a negative pressure generation groove, the negative pressure generation groove communicates with a high-pressure fluid side and is separated from a low-pressure fluid side by a land portion, the other of the slide parts is provided, in a sealing face thereof, with at least one interference groove communicating with the high-pressure fluid side for producing pressure variations in a fluid in the negative pressure generation groove, and the at least one interference groove has an end on an inside-diameter side extending to a position to radially overlap the negative pressure generation groove, whereby the pressure difference between an upstream end and a downstream end of the negative pressure generation groove is brought into a state of being constantly varying, and the flow of a fluid in the negative pressure generation groove also varies repeatedly. Thus, even when a sealed fluid contains a deposit formation-causing substance, formation of deposits in the negative pressure generation groove can be prevented, and the sealing function of the sealing faces can be maintained for a long period of time.

(2) The at least one interference groove includes a plurality of interference grooves provided circumferentially, and the plurality of interference grooves is arranged such that when one of the interference grooves is in a position facing an upstream end of the negative pressure generation groove, the other interference grooves are not in a position facing a downstream end of the negative pressure generation groove, whereby the pressure variations between the upstream end and the downstream end of the negative pressure generation groove can be produced greatly and reliably, and formation of deposits in the negative pressure generation groove can be further prevented.

(3) The one slide part is provided, in the sealing face thereof, with a fluid circulation groove that communicates with the high-pressure fluid side via an inlet portion and an outlet portion and is separated from the low-pressure fluid side by the land portion, and the downstream end of the negative pressure generation groove communicates with the inlet portion of the fluid circulation groove, whereby there is a pressure difference between the inlet portion and the outlet portion of the fluid circulation groove, which is in a state of being constantly varying alternately, and the fluid in the fluid circulation groove repeats movements. Thus, in addition to the prevention of formation of deposits in the negative pressure generation groove, even when the sealed fluid contains a deposit formation-causing substance, formation of deposits in the fluid circulation groove can be prevented, and the sealing function of the sealing faces can be maintained for a long period of time.

(4) The one slide part is provided with a positive pressure generation mechanism including a positive pressure generation groove in a portion enclosed by the fluid circulation groove in the sealing face thereof and the high-pressure fluid side, and the positive pressure generation groove has an upstream side communicating with the inlet portion of the fluid circulation groove, whereby in addition to the prevention of formation of deposits in the negative pressure generation groove and the fluid circulation groove, even when the sealed fluid contains a deposit formation-causing substance, formation of deposits in the positive pressure generation groove can be prevented, and the sealing function of the sealing faces can be maintained for a long period of time.

(5) The one slide part is a stationary-side seal ring, the other slide part is a rotating-side seal ring, and the rotating-side seal ring is made larger in outside diameter and smaller in inside diameter than the stationary-side seal ring, whereby the sealing face width depends on the stationary-side seal ring, which can reduce variation in the sealing face width.

BRIEF DESCRIPTION OF THE DRAWINGS

downstream of a dimple.

DESCRIPTION OF EMBODIMENTS

Hereinafter with reference to the drawings, embodiments for implementing this invention will be described illustratively based on implementation examples. However, the dimensions, materials, shapes, relative arrangements, and others of components described in the embodiments are not intended to limit the scope of the present invention only to them unless otherwise described explicitly.

First Embodiment

Figure 1:
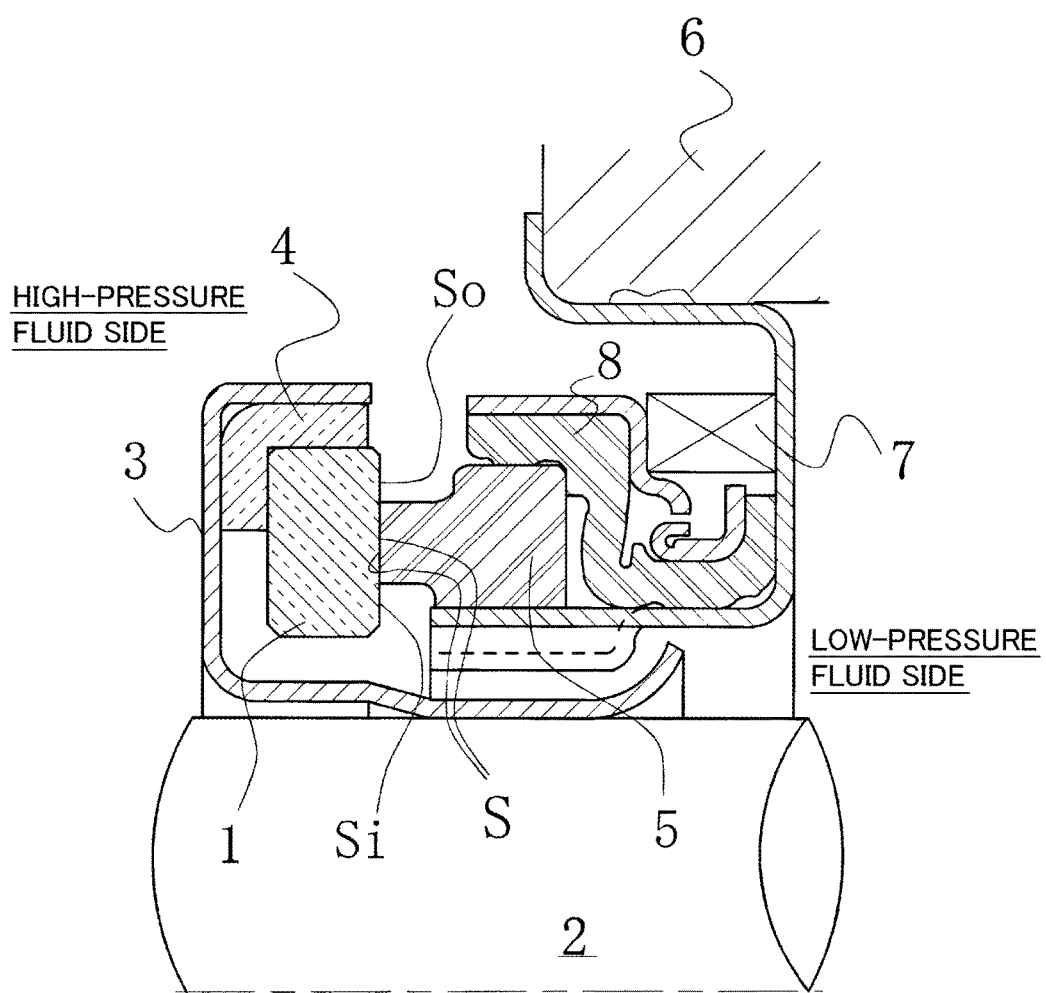
FIG. 1 is a vertical cross-sectional view showing an example of a mechanical seal according to a first embodiment of the present invention, showing an upper half thereof from the center of a rotating shaft.
Figure 2B:
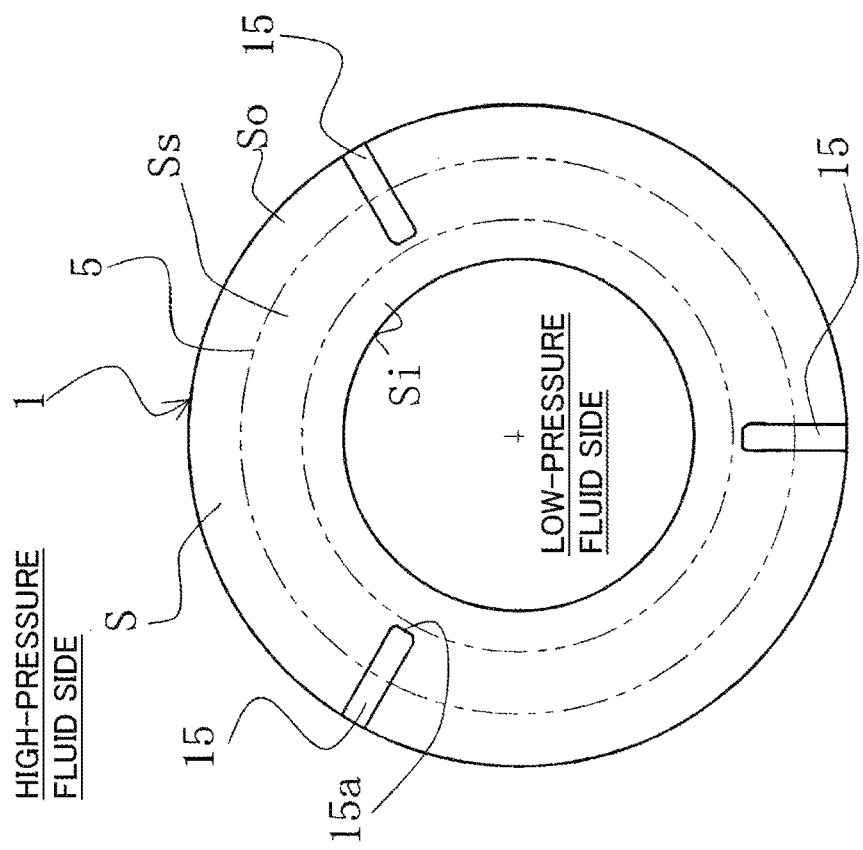
FIG. 2B shows the entire perimeter of a sealing face of a rotating-side seal ring in FIG. 1.
Figure 2A:
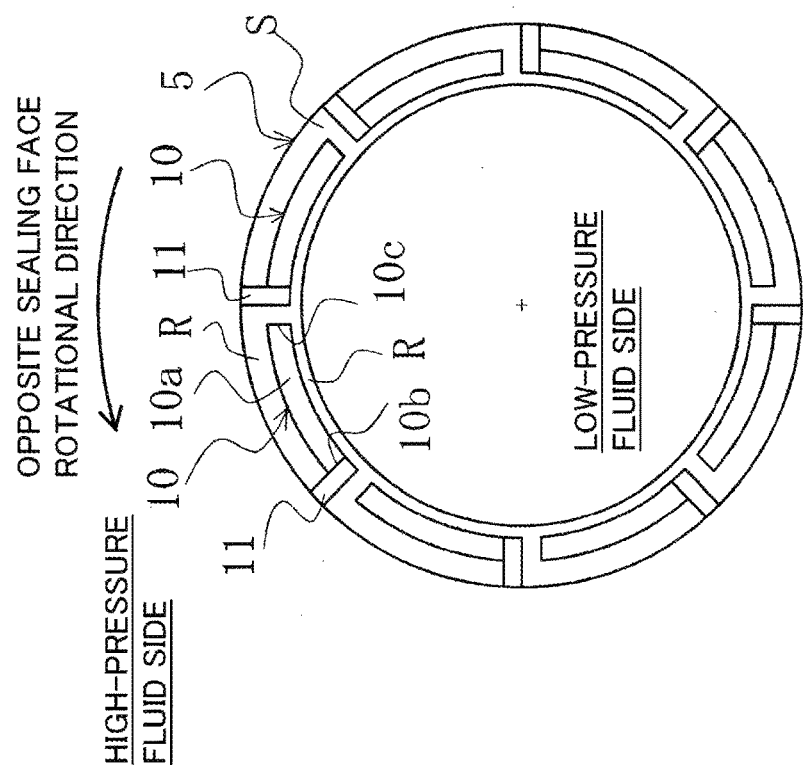
FIG. 2A shows the entire perimeter of a sealing face of a stationary-side seal ring in FIG. 1.

With reference to FIG. 1 and FIGS. 2A and 2B, a slide component according to a first embodiment of the present invention will be described.

In the following embodiment, a mechanical seal, an example of the slide component, will be described as an example. The outer peripheral side of slide parts constituting the mechanical seal is described as the high-pressure fluid side (sealed fluid side), and the inner peripheral side as the low-pressure fluid side (atmosphere side). However, the present invention is not limited to this, and is also applicable to a case where the high-pressure fluid side and the low-pressure fluid side are reversed.

FIG. 1 is a vertical cross-sectional view showing an example of the mechanical seal, which is an inside mechanical seal in a form of sealing a sealed fluid on the high-pressure fluid side tending to leak from the outer periphery of sealing faces toward the inner periphery. The mechanical seal is provided, on the side of a rotating shaft 2 to drive a rotor (e.g. a pump impeller not shown) on the high-pressure fluid side, with a rotating-side seal ring 1 in an annular shape, one slide part, provided in a state of being rotatable with the rotating shaft 2 in an integrated manner via a sleeve 3 and a cup gasket 4, and at a housing 6, with a stationary-side seal ring 5 in an annular shape, the other slide part, provided in a state of being non-rotatable and axially movable. By a coiled wave spring 7 and a bellows 8 axially biasing the stationary-side seal ring 5, the rotating-side seal ring 1 and the stationary-side seal ring 5 slide in close contact with each other on sealing portions S of sealing faces mirror-finished by lapping or the like. That is, the mechanical seal prevents the sealed fluid from flowing from the outer periphery of the rotating shaft 2 to the atmosphere side at the sealing portions S between the rotating-side seal ring 1 and the stationary-side seal ring 5.

In the mechanical seal, commonly, in order to accommodate a case where the rotation centers of the rotating-side seal ring 1 and the stationary-side seal ring 5 do not strictly agree, the sealing face width of one of them is made larger, specifically, the outside diameter thereof is made larger and the inside diameter thereof is made smaller to form a sealing face margin So on the outside-diameter side and a sealing face margin Si on the inside-diameter side. In the present invention, portions on which the rotating-side seal ring 1 and the stationary-side seal ring 5 actually slide are referred to as sealing portions Ss, and a sealing face including sealing face margins is referred to as a sealing face S.

FIG. 1 shows a case where the outside diameter of the rotating-side seal ring 1 is larger than the outside diameter of the stationary-side seal ring 5, and the inside diameter of the rotating-side seal ring 1 is smaller than the inside diameter of the stationary-side seal ring 5, and the sealing face margins are formed on the rotating-side seal ring 1. The present invention is not limited to this, and is also applicable to the opposite case as a matter of course.

In the case of FIG. 1, the sealing portion Ss and the sealing face S of the stationary-side seal ring 5 are the same.

With reference to FIGS. 2A and 2B, the shapes of the sealing faces S of the rotating-side seal ring 1 and the stationary-side seal ring 5 will be described.

In FIGS. 2A and 2B, the outside-diameter side of the sealing faces S is the high-pressure fluid side, and the inside-diameter side is the low-pressure fluid side, for example, the atmosphere side.

As shown in FIG. 2A, negative pressure generation mechanisms 10 each having a negative pressure generation groove 10a are provided on the low-pressure fluid side of the sealing face S of the stationary-side seal ring 5, that is, on the inner peripheral side.

The negative pressure generation mechanisms 10 each having the negative pressure generation groove (dimple) 10a will be described below.

In FIG. 2A, as the negative pressure generation mechanisms 10, reverse Rayleigh step mechanisms are illustrated as an example.

The reverse Rayleigh step mechanisms 10 each have the negative pressure generation groove 10a and a reverse Rayleigh step 10c, and are provided in a circumferential direction.

In FIG. 2A, eight reverse Rayleigh step mechanisms 10 are evenly spaced, which is not limiting. It is only necessary to provide at least one.

The negative pressure generation groove (dimple) 10a constituting a part of the reverse Rayleigh step mechanisms 10 is isolated by a smooth portion R (sometimes referred to as a "land portion" in the present invention) of the sealing face S at its high-pressure fluid side and low-pressure fluid side, but a downstream end 10b thereof communicates with the high-pressure fluid side via a radial groove 11. The radial groove 11 communicates with the high-pressure fluid side, but does not communicate with the low-pressure fluid side.

The negative pressure generation groove 10a is a shallow groove, and the radial groove 11 is a groove deeper than the negative pressure generation groove 10a.

As shown in FIG. 2B, the sealing face S of the rotating-side seal ring 1 is provided with interference grooves 15 for producing pressure variations in a fluid in the negative pressure generation grooves 10a.

The interference grooves 15 communicate with the high-pressure fluid side, and are arranged radially in positions to produce pressure variations in the fluid in the negative pressure generation grooves 10a.

In the case of FIG. 2, the interference grooves 15 are provided in the sealing face margin So on the outside-diameter side and the sealing portion Ss to slide on the stationary-side seal ring 5, and their ends 15a on the inside-diameter side extend to positions to radially overlap the negative pressure generation grooves 10a.

The shape of the interference grooves 15 illustrated in FIG. 2B is a substantially rectangular shape, but is not limited to this, and may be a circle, oval, or rhombus, for example. It is only essential that they communicate with the high-pressure fluid side, and the ends 15a on the inside-diameter side extend to positions to overlap the negative pressure generation grooves 10a.

The depth of the interference grooves 15 is not particularly limited, but may be set the same as the depth of the radial grooves 11, or slightly deeper.

In FIG. 2B, three interference grooves 15 are evenly spaced circumferentially, which is not limiting. It is only necessary to provide at least one. Further, they need not be evenly spaced.

When the rotating-side seal ring 1 is rotated, vortexes are formed in the vicinities of the interference grooves 15, and the interference grooves 15 accompanied by the vortexes move circumferentially.

Now, when one of the interference grooves 15 reaches the upstream end (reverse Rayleigh step) 10c of a negative pressure generation groove 10a, the pressure of the fluid in the vicinity of the upstream end 10c increases. At this time, since the other interference grooves 15 are set so as not to be in a position facing the downstream end 10b, there is no pressure increase of the fluid in the vicinity of the downstream end 10b. In the negative pressure generation groove 10a, the pressure at the upstream end 10c is essentially a negative pressure, and there is a pressure difference between it and the pressure at the downstream end 10b. When the interference groove 15 reaches the upstream end 10c, the difference between the pressure at the upstream end 10c and the pressure at the downstream end 10b decreases.

Next, when the interference groove 15 reaches the position facing the downstream end 10b of the negative pressure generation groove 10a, the pressure of the fluid in the vicinity of the downstream end 10b increases. At this time, since the other interference grooves 15 are set so as not to be in a position facing the upstream end 10c, there is no pressure increase of the fluid in the vicinity of the upstream end 10c, and the difference between the pressure at the upstream end 10c and the pressure at the downstream end 10b increases.

That is, when attention is focused on one negative pressure generation groove 10a, the action of the interference grooves 15 brings about a state where the pressure difference between the upstream end 10c and the downstream end 10b is constantly varying.

In the state where the pressure difference between the upstream end 10c and the downstream end 10b is constantly varying, the flow of the fluid in the negative pressure generation groove 10a also varies repeatedly. Thus, even when the sealed fluid contains a deposit formation-causing substance, formation of deposits in the negative pressure generation grooves 10a is prevented.

The first embodiment achieves prominent effects as below.

(1) The negative pressure generation mechanisms 10 including the negative pressure generation grooves 10a are provided on the low-pressure side of the sealing face S of the stationary-side seal ring 5, the negative pressure generation grooves 10a communicate with the high-pressure fluid side, and are separated from the low-pressure fluid side by the land portion R, the interference grooves 15 for producing pressure variations in the fluid in the negative pressure generation grooves 10a are provided in the sealing face S of the rotating-side seal ring 1 in such a manner as to communicate with the high-pressure fluid side, and the ends 15a of the interference grooves 15 on the inside-diameter side extend to the positions to radially overlap the negative pressure generation grooves 10a, so that the pressure difference between the upstream ends 10c and the downstream ends 10b of the negative pressure generation grooves 10a is brought into a state of being constantly varying, and the flow of the fluid in the negative pressure generation grooves 10a also varies repeatedly. Thus, even when the sealed fluid contains a deposit formation-causing substance, formation of deposits in the negative pressure generation grooves 10a can be prevented, and the sealing function of the sealing faces can be maintained for a long period of time.

(2) Since the rotating-side seal ring 1 is made larger in outside diameter and smaller in inside diameter than the stationary-side seal ring 5, the sealing face width depends on the stationary-side seal ring 5. This can reduce variation in the sealing face width.

(3) Since the plurality of interference grooves 15 is provided circumferentially, and the plurality of interference grooves 15 is arranged such that when one of the interference grooves 15 is in a position facing the upstream end 10c of a negative pressure generation groove 10a, the other interference grooves 15 are not in a position facing the downstream end 10b of the negative pressure generation groove 10a, and conversely, when one of the interference grooves 15 is in a position facing the downstream end 10b of a negative pressure generation groove 10a, the other interference grooves 15 are not in a position facing the upstream end 10c of the negative pressure generation groove 10a, the pressure variations between the upstream ends 10c and the downstream ends 10b of the negative pressure generation grooves 10a can be produced greatly and reliably, and formation of deposits in the negative pressure generation grooves 10a can be further prevented.

Second Embodiment

Figures 3A, 3B:
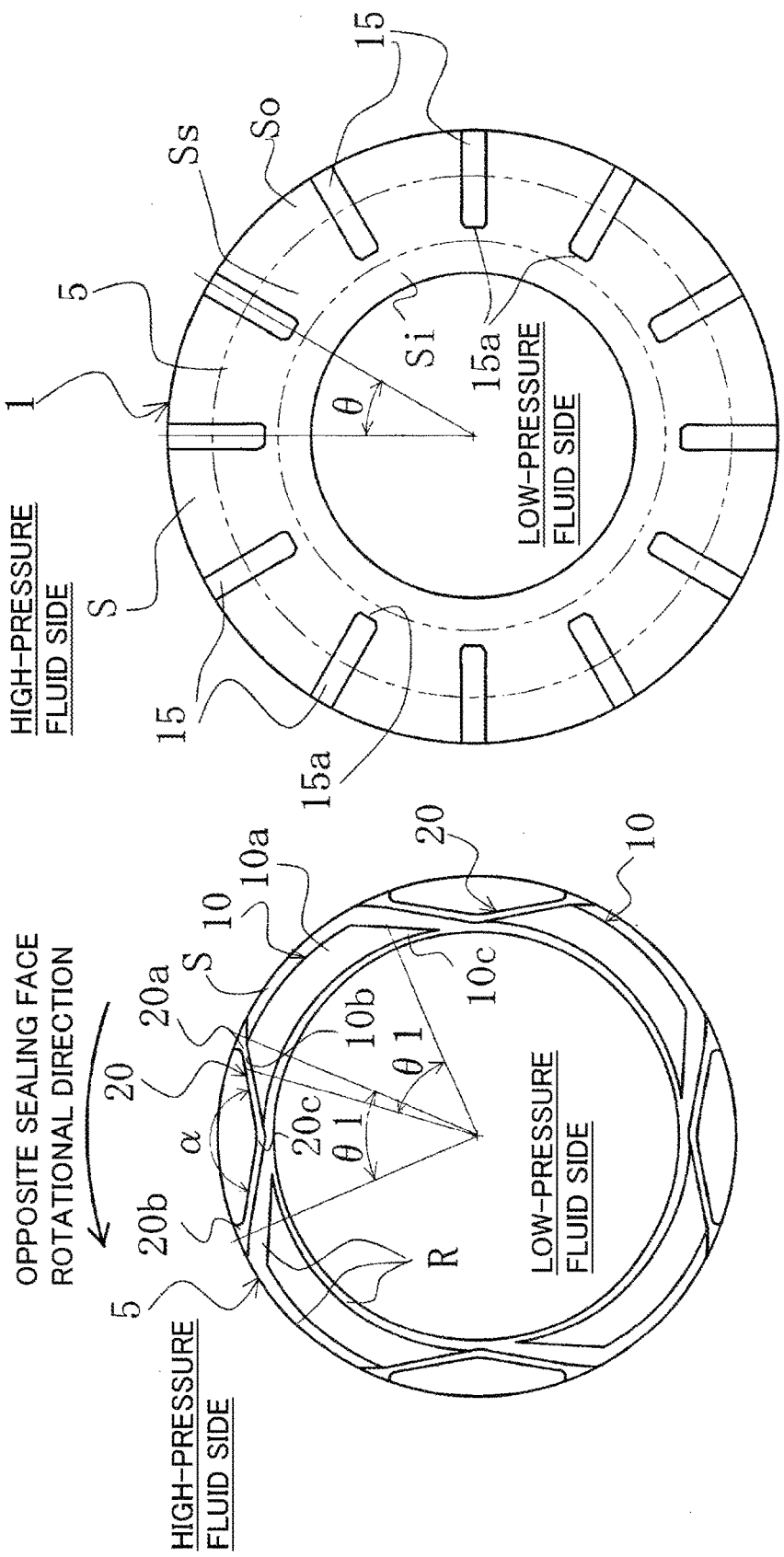
FIG. 3A shows the entire perimeter of a sealing face of a stationary-side seal ring in a second embodiment.
FIG. 3B shows the entire perimeter of a sealing face of a rotating-side seal ring also in the second embodiment.

With reference to FIGS. 3A and 3B, a slide component according to a second embodiment of the present invention will be described.

The second embodiment is different from the first embodiment in that fluid circulation grooves 20 are added in a sealing face S of a stationary-side seal ring 5, but the other basic configuration is the same as that in the first embodiment. The same numerals and symbols as those in the first embodiment denote the same members, and redundant descriptions will be omitted.

In FIG. 3A, in the sealing face S of the stationary-side seal ring 5, four fluid circulation grooves 20 communicating with the high-pressure fluid side and separated from the low-pressure fluid side by a smooth portion R (sometimes referred to as a "land portion" in the present invention) on the sealing face are evenly spaced circumferentially.

The number of the fluid circulation grooves 20 is not limited to four. It is only necessary to provide at least one. Further, they need not be evenly spaced.

The fluid circulation grooves 20 each include an inlet portion 20a for an entry from the high-pressure fluid side, an outlet portion 20b for an exit to the high-pressure fluid side, and a connection portion 20c circumferentially connecting the inlet portion 20a and the outlet portion 20b. The fluid circulation grooves 20 have the function of actively introducing a sealed fluid from the high-pressure fluid side into a sealing portion and discharging it in order to prevent a fluid containing corrosion products or the like from being concentrated on a sealing portion Ss, and are formed with wide mouths at the inlet portion 20a and the outlet portion 20b as shown in the figure to facilitate taking the sealed fluid into the sealing portion and discharging it in accordance with the rotation of the opposite sealing face, and on the other hand, are separated from the low-pressure fluid side by the land portion R to reduce leakage.

In this embodiment, the inlet portion 20a and the outlet portion 20b are formed in a linear shape, and form a substantially V shape, but are not particularly limited to this. The interior angle α between the inlet portion 20a and the outlet portion 20b may be further increased or reduced. They may be formed in a curved shape (such as an arc shape) instead of a linear shape. The width and depth of the fluid circulation grooves 20 are set optimally according to the pressure, type (viscosity), and others of the sealed fluid. An example of the depth is about 100 to 300 μm.

The fluid circulation grooves 20 are not limited to the substantially V shape, and may be in a U shape, for example. It is only essential that the inlet portion 20a and the outlet portion 20b communicate with the high-pressure fluid side.

In the sealing face S of the stationary-side seal ring 5, four negative pressure generation mechanisms 10 are evenly spaced circumferentially in such a manner as to be located between adjacent fluid circulation grooves 20. Downstream ends 10b of negative pressure generation grooves 10a constituting the negative pressure generation mechanisms 10 communicate with the inlet portions 20a of the fluid circulation grooves 20, and the land portion R is present between upstream ends 10c and the outlet portions 20b of the fluid circulation grooves 20 on the upstream side.

In the second embodiment, the inlet portions 20a of the fluid circulation grooves 20 also serve the function of the radial grooves 11 in the first embodiment.

In a sealing face S of a rotating-side seal ring 1, twelve interference grooves 15 for producing pressure variations in the fluid in the negative pressure generation grooves 10a and the fluid circulation grooves 20 are evenly spaced.

In the case of FIG. 3B, the interference grooves 15 are provided in a sealing face margin So on the outside-diameter side, and their ends 15a on the inside-diameter side extend to positions to radially overlap the negative pressure generation grooves 10a and the inlet portions 10a and the outlet portions 10b of the fluid circulation grooves 10.

In FIG. 3B, the twelve interference grooves 15 are evenly spaced circumferentially. The plurality of interference grooves 15 is arranged such that when one of the interference grooves 15 is in a position facing the upstream end 10c of a negative pressure generation groove 10a, the other interference grooves 15 are not in a position facing the downstream end 10b of the negative pressure generation groove 10a, and conversely, when one of the interference grooves 15 is in a position facing the downstream end 10b of a negative pressure generation groove 10a, the other interference grooves 15 are not in a position facing the upstream end 10c of the negative pressure generation groove 10a, and further, is arranged such that when one of the interference grooves 15 is in a position facing the inlet portion 20a of a fluid circulation groove 20, the other interference grooves 15 are not in a position facing the outlet portion 20b of the fluid circulation groove 20, and conversely, when one of the interference grooves 15 is in the position facing the outlet portion 20b, the other interference groove 15 are not in the position facing the inlet portion 20a.

In the case of FIGS. 3A and 3B, the four negative pressure generation grooves 10a and the four fluid circulation grooves 20 are evenly spaced. The central angle θ1 between the upstream end 10c and the downstream end 10b of the negative pressure generation grooves 10a, and the central angle θ1 between the inlet portion 20a and the outlet portion 20b of the fluid circulation grooves 20 are each about 45°, whereas the central angle θ between adjacent interference grooves 15 is 30°. Therefore, when the rotating-side seal ring 1 rotates, and one of the interference grooves 15 is in a position facing the upstream end 10c of a negative pressure generation groove 10a or the inlet portion 20a of a fluid circulation groove 20, the other interference grooves 15 are not in a position facing the downstream end 10b of the negative pressure generation groove 10a or the outlet portion 20b of the fluid circulation groove 20.

When the rotating-side seal ring 1 is rotated, vortexes are formed in the vicinities of the interference grooves 15, and the interference grooves 15 accompanied by the vortexes move circumferentially.

The effects of the interference grooves 15 on the negative pressure generation grooves 10a are the same as those in the first embodiment.

When attention is focused on the effects of the interference grooves 15 on the fluid circulation grooves 20, for example, when one of the interference grooves 15 reaches a position facing the inlet portion 20a of a fluid circulation groove 20, the pressure of a fluid in the inlet portion 20a increases. At this time, since the other interference grooves 15 are set so as not to be in a position facing the outlet portion 20b, there is no pressure increase of the fluid in the outlet portion 20b, resulting in the state, the pressure in the inlet portion 20a>the pressure in the outlet portion 20b.

Next, when the interference groove 15 reaches the position facing the outlet portion 20b of the fluid circulation groove 20, the pressure of the fluid in the outlet portion 10b increases. At this time, since the other interference grooves 15 are set so as not to be in a position facing the inlet portion 10b, there is no pressure increase of the fluid in the inlet portion 20b, resulting in the state, the pressure in the inlet portion 20a<the pressure in the outlet portion 20b.

That is, when attention is focused on one fluid circulation groove 20, the action of the interference grooves 15 brings about a state where there is a pressure difference between the inlet portion 20a and the outlet portion 20b, which is constantly varying alternately.

In the state where there is a pressure difference between the inlet portion 20a and the outlet portion 20b, which is constantly varying alternately, the fluid in the fluid circulation groove 20 repeats movements. Thus, even when a sealed fluid contains a deposit formation-causing substance, formation of deposits in the fluid circulation grooves 20 can be prevented.

The second embodiment achieves prominent effects as below.

(1) In the sealing face S of the stationary-side seal ring 5, the fluid circulation grooves 20 communicating with the high-pressure fluid side via the inlet portions 20a and the outlet portions 20b and separated from the low-pressure fluid side by the land portion R are provided, and the downstream ends 10b of the negative pressure generation grooves 10a communicate with the inlet portions 20a of the fluid circulation grooves 20. This brings about a state where there is a pressure difference between the inlet portions 20a and the outlet portions 20b of the fluid circulation grooves 20, which is constantly varying alternately, and the fluid in the fluid circulation grooves 20 repeats movements. Thus, in addition to the prevention of formation of deposits in the negative pressure generation grooves 10a, even when the sealed fluid contains a deposit formation-causing substance, formation of deposits in the fluid circulation grooves 20 can be prevented, and the sealing function of the sealing faces can be maintained for a long period of time.

(2) Since the rotating-side seal ring 1 is made larger in outside diameter and smaller in inside diameter than the stationary-side seal ring 5, the sealing face width depends on the stationary-side seal ring 5, which can reduce variation in the sealing face width.

(3) The plurality of interference grooves 15 is provided circumferentially, and the plurality of interference grooves 15 is arranged such that when one of the interference grooves 15 is in a position facing the upstream end 10c of a negative pressure generation groove 10a or the inlet portion 20a of a fluid circulation groove 20, the other interference grooves 15 are not in a position facing the downstream end 10b of the negative pressure generation groove 10a or the outlet portion 20b of the fluid circulation groove 20, and conversely, when one of the interference grooves 15 is in a position facing the downstream end 10b of a negative pressure generation groove 10a or the outlet portion 20b of a fluid circulation groove 20, the other interference grooves 15 are not in a position facing the upstream end 10c of the negative pressure generation groove 10a or the inlet portion 20a of the fluid circulation groove 20. Thus, the pressure variations between the upstream ends 10c and the downstream ends 10b of the negative pressure generation grooves 10a can be produced greatly and reliably, and in addition, there is a pressure difference between the inlet portions 20a and the outlet portions 20b of the fluid circulation grooves 20, which is in the state of being constantly varying alternately, and the fluid in the fluid circulation grooves repeats movements. Thus, formation of deposits in the negative pressure generation grooves 10a and the fluid circulation grooves 20 can be further prevented, and the sealing function of the sealing faces can be maintained for a long period of time.

Third Embodiment

Figures 4A, 4B:
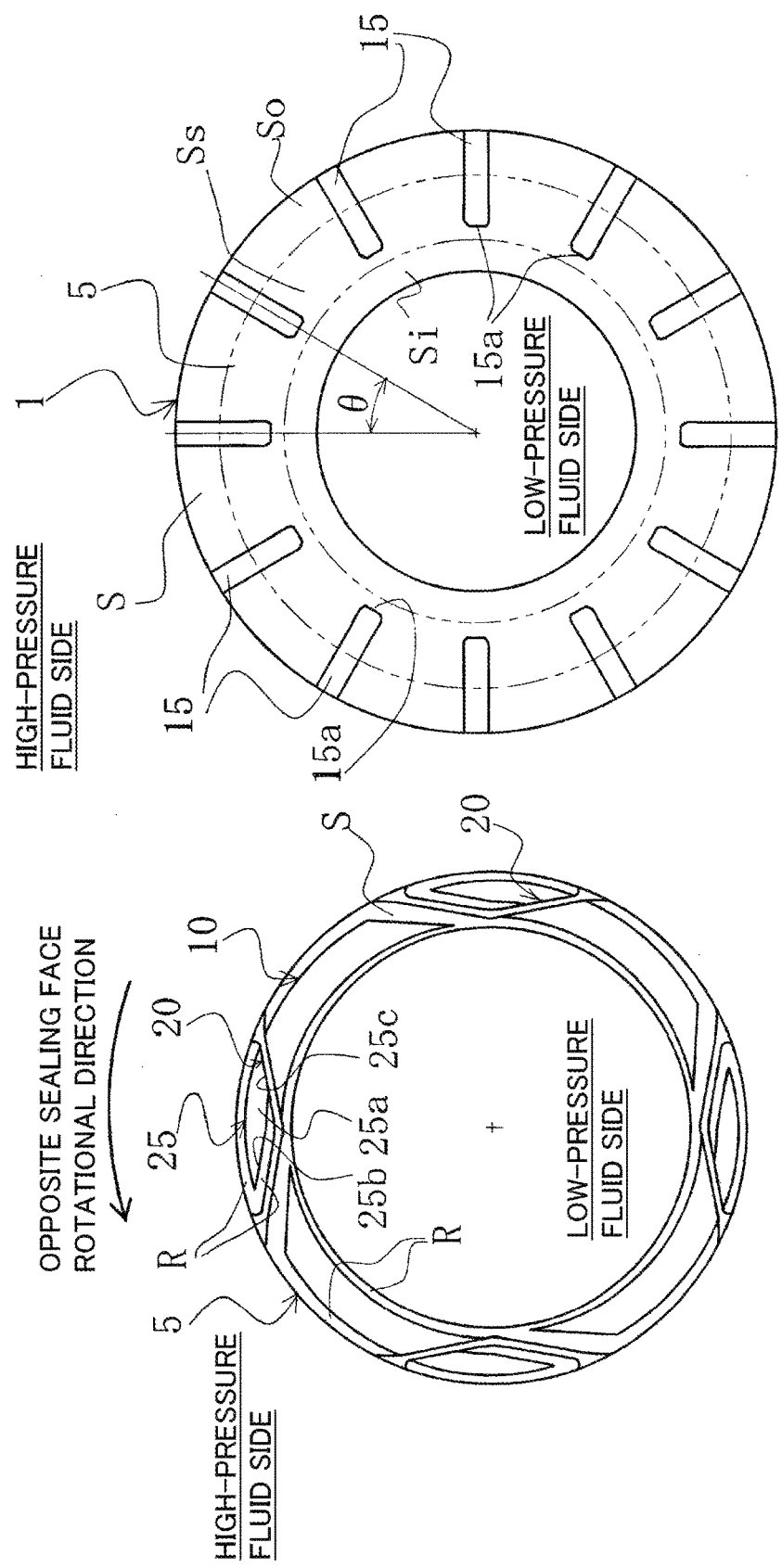
FIG. 4A shows the entire perimeter of a sealing face of a stationary-side seal ring in a third embodiment.
FIG. 4B shows the entire perimeter of a sealing face of a rotating-side seal ring also in the third embodiment.

With reference to FIGS. 4A and 4B, a slide component according to a third embodiment of the present invention will be described.

The third embodiment is different from the second embodiment in that positive pressure generation mechanisms 25 are added on a sealing face S of a stationary-side seal ring 5, but the other basic configuration is the same as that in the second embodiment. The same numerals and symbols as those in the second embodiment denote the same members, and redundant descriptions will be omitted.

In FIG. 4A, the positive pressure generation mechanisms 25 each having a positive pressure generation groove 25a shallower than fluid circulation grooves 20 are provided in portions enclosed by the fluid circulation grooves 20 in the sealing face S of the stationary-side seal ring 5 and the high-pressure fluid side.

The positive pressure generation mechanisms 25 are intended to generate positive pressure (dynamic pressure), thereby increasing a fluid film between sealing faces and increasing lubrication performance.

The positive pressure generation grooves 25a have upstream ends 25c communicating with inlet portions 20a of the fluid circulation grooves 20, and downstream ends (also referred to as Rayleigh steps) 25b separated from outlet portions 20b of the fluid circulation grooves 20 by land portions R. The positive pressure generation grooves 25a are also separated from the high-pressure fluid side by the land portions R.

In this embodiment, each positive pressure generation mechanism 25 is formed from a Rayleigh step mechanism including the positive pressure generation groove 25a and the Rayleigh step 25b, but is not limited to this, and may be formed by a femto-groove with a dam, for example. It is only essential that it be a mechanism to generate positive pressure.

The Rayleigh step mechanism will be described in detail below.

When a rotating-side seal ring 1 is rotated, vortexes are formed in the vicinities of interference grooves 15, and the interference grooves 15 accompanied by the vortexes move circumferentially.

The effects of the interference grooves 15 on negative pressure generation grooves 10a and the fluid circulation grooves 20 are the same as those in the second embodiment.

When attention is focused on the effects of the interference grooves 15 on the positive pressure generation grooves 25a, for example, when one of the interference grooves 15 reaches the upstream end 25c of a positive pressure generation groove 25a, the pressure of a fluid in the vicinity of the upstream end 25c increases. At this time, the other interference grooves 15 are set so as not to be in a position facing the downstream end 25b, there is no pressure increase of the fluid in the vicinity of the downstream end 25b. In the positive pressure generation groove 25a, the pressure in the upstream end 25c is essentially smaller than that in the downstream end 25b. When the interference groove 15 reaches the upstream end 25c, the difference between the pressure at the upstream end 25c and the pressure at the downstream end 25b decreases.

Next, when the interference groove 15 reaches a position facing the downstream end 25b of the positive pressure generation groove 25a, the pressure of the fluid in the vicinity of the downstream end 25b increases. At this time, the other interference grooves 15 are set so as not to be in a position facing the upstream end 25c, there is no pressure increase of the fluid in the vicinity of the upstream end 25c, and the difference between the pressure at the upstream end 25c and the pressure at the downstream end 25b increases.

That is, when attention is focused on one positive pressure generation groove 25a, the action of the interference grooves 15 brings about a state where the pressure difference between the upstream end 25c and the downstream end 25b is constantly varying.

In the state where the pressure difference between the upstream end 25c and the downstream end 25b is constantly varying, the flow of the fluid in the positive pressure generation groove 25a also varies repeatedly. Thus, even when a sealed fluid contains a deposit formation-causing substance, formation of deposits in the positive pressure generation grooves 25a can be prevented.

The third embodiment achieves prominent effects as below.

(1) Since the positive pressure generation mechanisms 25 including the positive pressure generation grooves 25a shallower than the fluid circulation grooves 20 are provided in the portions enclosed by the fluid circulation grooves 20 in the sealing face S of the stationary-side seal ring 5 and the high-pressure fluid side, and the upstream side of the positive pressure generation grooves 25a communicate with the inlet portions 20a of the fluid circulation grooves 20, in addition to the prevention of formation of deposits in the negative pressure generation grooves 10a and the fluid circulation grooves 20, even when the sealed fluid contains a deposit formation-causing substance, formation of deposits in the positive pressure generation grooves 25a can be prevented, and the sealing function of the sealing faces can be maintained for a long period of time.

Here, with reference to FIGS. 5A and 5B, a positive pressure generation mechanism including a positive pressure generation groove (Rayleigh step mechanism) and a negative pressure generation mechanism including a negative pressure generation groove (reverse Rayleigh step mechanism) in the present invention will be described.

Figures 5A, 5B:
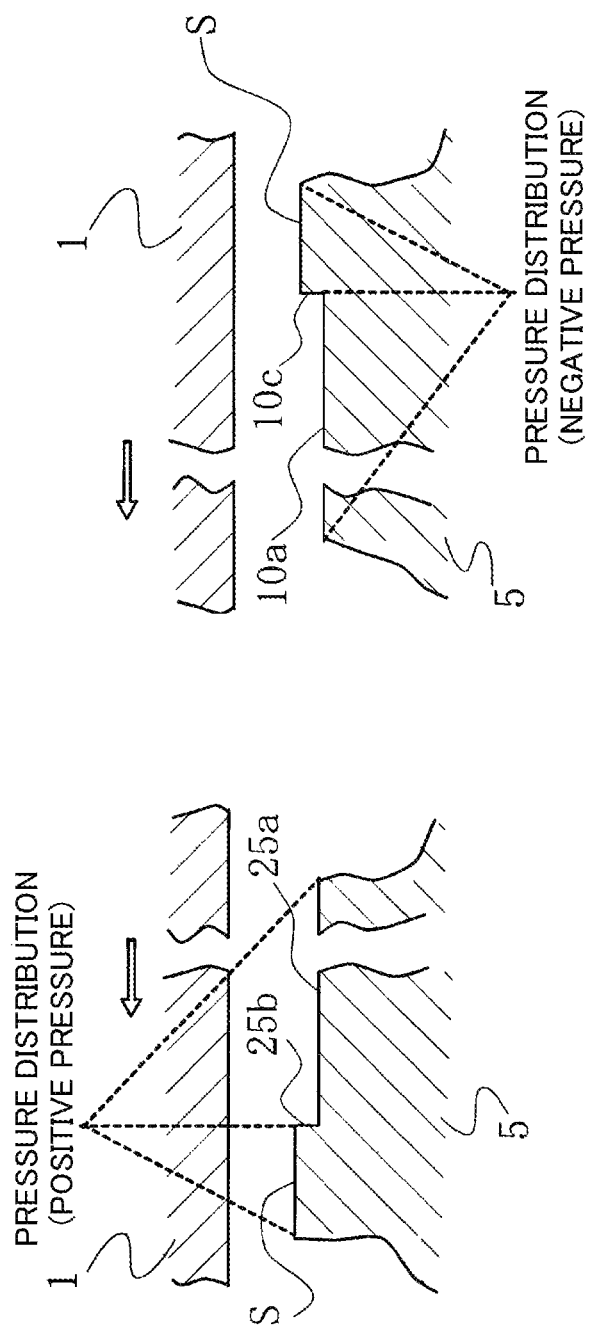
FIG. 5A is a diagram for explaining a positive pressure generation mechanism including a narrowed gap (step)
FIG. 5B a negative pressure generation mechanism including a widened gap (step) upstream of a dimple.

In FIG. 5A, as shown by an arrow, the rotating-side seal ring 1 rotationally moves in a counterclockwise direction relative to the stationary-side seal ring 5. When a positive pressure generation groove (dimple) 25a is formed in the sealing face S of the stationary-side seal ring 5, there is a narrowed gap (step, also referred to as a Rayleigh step) 25b downstream of the dimple 25a. The opposite sealing face of the rotating-side seal ring 1 is flat.

When the rotating-side seal ring 1 relatively moves in a direction shown by the arrow, a fluid interposed between the sealing faces of the rotating-side seal ring 1 and the stationary-side seal ring 5 tends to follow it and move in the moving direction of the rotating-side seal ring 1 by its viscosity. At that time, due to the presence of the narrowed gap (step) 25b, dynamic pressure (positive pressure) as shown by broken lines is generated.

In FIG. 5B, as shown by an arrow, the rotating-side seal ring 1 rotationally moves in a counterclockwise direction relative to the stationary-side seal ring 5. When a negative pressure generation groove (dimple) 10a is formed in the sealing face S of the stationary-side seal ring 5, there is a widened gap (step, also referred to as a reverse Rayleigh step) 10d upstream of the dimple 10a. The opposite sealing face of the rotating-side seal ring 1 is flat. When the rotating-side seal ring 1 relatively moves in a direction shown by the arrow, a fluid interposed between the sealing faces of the rotating-side seal ring 1 and the stationary-side seal ring 5 tends to follow it and move in the moving direction of the rotating-side seal ring 1 by its viscosity. At that time, due to the presence of the widened gap (step) 10d, dynamic pressure (negative pressure) as shown by broken lines is generated.

Therefore, negative pressure is generated upstream in the dimple 10a, and positive pressure is generated downstream. Then, cavitation occurs in an upstream negative pressure generation region.

Although the embodiments of the present invention have been described above with reference to the drawings, its detailed configuration is not limited to the embodiments. Any changes and additions made without departing from the scope of the present invention are included in the present invention.

For example, although in the above embodiments, an example in which a slide part is used for one of a pair of a rotating seal ring and a stationary seal ring in a mechanical seal device has been described, it may be used as a slide part of a bearing that slides on a rotating shaft while sealing a lubricating oil on one side in an axial direction of a cylindrical sealing face.

Further, for example, although in the above embodiments, a case where a high-pressure sealed fluid is present on the outer-peripheral side has been described, the present invention may be applied to a case where a high-pressure fluid is on the inner-peripheral side.

Further, for example, although in the above embodiments, a case where fluid circulation grooves are provided in a stationary-side seal ring of a mechanical seal constituting a slide component, and interference grooves are provided in a rotating-side seal ring has been described, on the contrary, fluid circulation grooves may be provided in a rotating-side seal ring, and interference grooves in a stationary-side seal ring.

REFERENCE SIGN LIST 1 rotating-side seal ring
2 rotating shaft
3 sleeve
4 cup gasket
5 stationary-side seal ring
6 housing
7 coiled wave spring
8 bellows
10 negative pressure generation mechanism (reverse Rayleigh step mechanism)
10a negative pressure generation groove (dimple)
10b downstream end
10c upstream end (reverse Rayleigh step)
11 radial groove
15 interference groove
15a end of the interference groove on the inside-diameter side
20 fluid circulation groove
20a inlet portion
20b outlet portion
20c connection portion
25 positive pressure generation mechanism
25a positive pressure generation groove
25b downstream end (Rayleigh step)
25c upstream end
R land portion
S sealing face
Ss sealing portion

The invention claimed is:

1. A slide component comprising:
a pair of slide parts that relatively slide on each other,
one of the slide parts being provided, on a low-pressure side of a sealing face thereof, with a negative pressure generation mechanism comprising a negative pressure generation groove, the negative pressure generation groove communicating with a high-pressure fluid side and being separated from a low-pressure fluid side by a land portion,
the other of the slide parts being provided, in a sealing face thereof, with at least one interference groove communicating with the high-pressure fluid side for producing pressure variations in a fluid in the negative pressure generation groove,
wherein the sealing face of the other slide part has (i) a sealing portion at which the other slide part slides on the one slide part, (ii) an outer sealing face margin on an outer diameter side of the sealing portion, and (iii) an inner sealing face margin on an inner diameter side of the sealing portion, wherein the outer sealing face margin has an outer diameter which is larger than an outer diameter of the one slide part, and the inner sealing face margin has an inner diameter which is smaller than an inner diameter of the one slide part,
each interference groove is provided in continuously the sealing portion and one of the outer and inner sealing face margins, and
each interference groove has an end in the one of the outer and inner sealing face margins in a manner that the end communicates with the high-pressure fluid side, and
each interference groove has another end in the sealing portion in a manner extending to a position to radially overlap the negative pressure generation groove,
wherein the at least one interference groove comprises a plurality of interference grooves provided circumferentially, the plurality of interference grooves being arranged at particular intervals such that when one of the interference grooves is at a position facing an upstream end of the negative pressure generation groove, none of the interference grooves is at a position facing a downstream end of the negative pressure generation groove, and when one of the interference grooves is at a position facing the downstream end of the negative pressure generation groove, none of the interference grooves is at a position facing the upstream end of the negative pressure generation groove, so that pressure variations in the fluid in the negative pressure generation groove constantly occur alternately between the upstream end and the downstream end of the negative pressure generation groove when in use.

2. The slide component according to claim 1, wherein the negative pressure generation mechanism is formed from a reverse Rayleigh step mechanism.

3. The slide component according to claim 1, wherein
the one slide part is provided, in the sealing face thereof, with a fluid circulation groove that communicates with the high-pressure fluid side via an inlet portion and an outlet portion and is separated from the low-pressure fluid side by a land portion, and
the negative pressure generation groove has a downstream end communicating with the inlet portion of the fluid circulation groove.

4. The slide component according to claim 1, wherein
the one slide part is provided with a positive pressure generation mechanism comprising a positive pressure generation groove in a portion enclosed by a fluid circulation groove in the sealing face thereof and the high-pressure fluid side, and
the positive pressure generation groove has an upstream side communicating with an inlet portion of the fluid circulation groove.

5. The slide component according to claim 4, wherein the positive pressure generation mechanism is formed from a Rayleigh step mechanism.

6. The slide component according to claim 1, wherein
the one slide part is a stationary-side seal ring, and
the other slide part is a rotating-side seal ring.

7. The slide component according to claim 2, wherein
the one slide part is provided, in the sealing face thereof, with a fluid circulation groove that communicates with the high-pressure fluid side via an inlet portion and an outlet portion and is separated from the low-pressure fluid side by a land portion, and
the negative pressure generation groove has a downstream end communicating with the inlet portion of the fluid circulation groove.

8. The slide component according to claim 2, wherein
the one slide part is provided with a positive pressure generation mechanism comprising a positive pressure generation groove in a portion enclosed by a fluid circulation groove in the sealing face thereof and the high-pressure fluid side, and
the positive pressure generation groove has an upstream side communicating with an inlet portion of the fluid circulation groove.

9. The slide component according to claim 2, wherein
the one slide part is a stationary-side seal ring, and
the other slide part is a rotating-side seal ring, and
the rotating-side seal ring is made larger in outside diameter and smaller in inside diameter than the stationary-side seal ring.

10. The slide component according to claim 3, wherein
the one slide part is provided with a positive pressure generation mechanism comprising a positive pressure generation groove in a portion enclosed by the fluid circulation groove in the sealing face thereof and the high-pressure fluid side, and
the positive pressure generation groove has an upstream side communicating with an inlet portion of the fluid circulation groove.

11. The slide component according to claim 3, wherein
the one slide part is a stationary-side seal ring, and
the other slide part is a rotating-side seal ring.

12. The slide component according to claim 4, wherein
the one slide part is a stationary-side seal ring, and
the other slide part is a rotating-side seal ring.

13. The slide component according to claim 5, wherein
the one slide part is a stationary-side seal ring, and
the other slide part is a rotating-side seal ring.

14. The slide component according to claim 7, wherein
the one slide part is provided with a positive pressure generation mechanism comprising a positive pressure generation groove in a portion enclosed by the fluid circulation groove in the sealing face thereof and the high-pressure fluid side, and
the positive pressure generation groove has an upstream side communicating with an inlet portion of the fluid circulation groove.

15. The slide component according to claim 7, wherein
the one slide part is a stationary-side seal ring, and
the other slide part is a rotating-side seal ring.

16. The slide component according to claim 8, wherein the positive pressure generation mechanism is formed from a Rayleigh step mechanism.

17. The slide component according to claim 8, wherein
the one slide part is a stationary-side seal ring, and
the other slide part is a rotating-side seal ring.

18. The slide component according to claim 10, wherein the positive pressure generation mechanism is formed from a Rayleigh step mechanism.

19. The slide component according to claim 10, wherein
the one slide part is a stationary-side seal ring, and
the other slide part is a rotating-side seal ring.

20. The slide component according to claim 14, wherein the positive pressure generation mechanism is formed from a Rayleigh step mechanism.

* * * * *